(12) United States Patent
Travis

(10) Patent No.: US 8,687,376 B2
(45) Date of Patent: Apr. 1, 2014

(54) ROTATING AND MOVING MECHANISM

(75) Inventor: Tom Travis, Newbury Park, CA (US)

(73) Assignee: Nokia Corporation, Espoo (FI)

( * ) Notice: Subject to any disclaimer, the term of this patent is extended or adjusted under 35 U.S.C. 154(b) by 360 days.

(21) Appl. No.: 13/079,397

(22) Filed: Apr. 4, 2011

(65) Prior Publication Data

US 2012/0250283 A1    Oct. 4, 2012

(51) Int. Cl.
*H05K 5/00* (2006.01)

(52) U.S. Cl.
USPC ............................................ 361/755; 361/728

(58) Field of Classification Search
USPC ................... 361/756, 755, 727–732; 455/575.1–575.3, 575.7, 575.1–575.4
See application file for complete search history.

(56) References Cited

U.S. PATENT DOCUMENTS

| 7,149,557 | B2 * | 12/2006 | Chadha | 455/575.1 |
| 7,564,691 | B2 * | 7/2009 | Kuwajima et al. | 361/728 |
| 7,873,396 | B2 * | 1/2011 | Kang et al. | 455/575.3 |
| 7,904,127 | B2 * | 3/2011 | Saitoh | 455/575.4 |
| 8,103,322 | B2 * | 1/2012 | Burbidge | 455/575.4 |
| 8,245,143 | B2 * | 8/2012 | Yach et al. | 715/744 |
| 2002/0102946 | A1 | 8/2002 | Sangiovanni | |
| 2005/0141703 | A1 | 6/2005 | Hickey et al. | |
| 2006/0025184 | A1 * | 2/2006 | Cho et al. | 455/575.4 |
| 2006/0030381 | A1 * | 2/2006 | Byun et al. | 455/575.4 |
| 2007/0153457 | A1 * | 7/2007 | Hosoya et al. | 361/681 |
| 2008/0004083 | A1 * | 1/2008 | Ohki et al. | 455/566 |
| 2010/0073852 | A1 | 3/2010 | Tompkin | |
| 2010/0151902 | A1 | 6/2010 | Richardson et al. | |

FOREIGN PATENT DOCUMENTS

| EP | 1528757 A1 | 5/2005 |
| EP | 1840697 A1 | 10/2007 |
| WO | 2005/053287 A1 | 6/2005 |

OTHER PUBLICATIONS

International Search Report and Written Opinion received for corresponding Patent Cooperation Treaty Application No. PCT/FI2012/050302, dated Jul. 19, 2012, 12 pages.

* cited by examiner

*Primary Examiner* — Hung S Bui
(74) *Attorney, Agent, or Firm* — Harrington & Smith

(57) ABSTRACT

An apparatus includes a first body part comprising a first user interface and a second body part comprising a second user interface. The apparatus further comprises a mechanism configured to rotate the first body part with respect to the second body part over a pivot axis, and move the first body part with respect to the second body part substantially parallel to the pivot axis.

18 Claims, 4 Drawing Sheets

ROTATING AND MOVING MECHANISM

TECHNICAL FIELD

The present invention generally relates to a rotating and a moving mechanism for a body part. The invention relates particularly, though not exclusively, to a rotating and a moving mechanism for a two-part electronic apparatus.

BACKGROUND ART

Presently, apparatuses with multiple body parts are known. Typically, rotatable mechanisms are used to allow a user to rotatably move the body parts to align the body parts in horizontal or vertical positions. For example, rotatable mechanism is used on clamshell mobile apparatuses to allow a user to conveniently move the body parts in open and closed positions.

Users may also want apparatuses with a large screen but they do not want to carry an apparatus with the size of a laptop. At the same time the appearance of the apparatus is important for the users and the apparatus should look as smooth as possible in all operating positions.

SUMMARY

According to a first example aspect of the invention there is provided an apparatus comprising:
a first body part comprising a first user interface;
a second body part comprising a second user interface;
a mechanism configured to:
rotate the first body part with respect to the second body part over a pivot axis; and
move the first body part with respect to the second body part substantially parallel to the pivot axis.

According to an example embodiment of the invention, the first user interface comprises a first display and the second user interface comprises a second display. In a first operating position only the first user interface may be operable by a user. In a second operating position the first user interface and the second user interface may be operable by the user.

In the first operating position the first body part may be configured to be placed on top of the second body part. In the second operating position the second body part may be configured to be alongside of the first body part. The mechanism may be further configured to move the first body part with respect to the second body part substantially perpendicular to the pivot axis from a first operating position to a first intermediate position, rotate the first body part with respect to the second body part over a pivot axis from the first intermediate position to a second intermediate position, move the first body part with respect to the second body part substantially parallel to the pivot axis from the second intermediate position to a third intermediate position, and move the first body part with respect to the second body part substantially perpendicular to the pivot axis from the third intermediate position to a second operating position.

According to an example embodiment of the invention, the mechanism is configured to be at least partially located in a recess of the second body part when the apparatus is in the first operating position or in the second operating position. The mechanism may be configured to be moved outward from the recess of the second body part when the first body part is moved from the first operating position to the first intermediate position. The apparatus may further comprise a first spring configured to force the mechanism inward to the recess of the second body part when the first body part is in the first intermediate position or in the third intermediate position.

In an example embodiment of the invention, the mechanism may comprise at least two parts configured to be telescopically movable with respect to each other enabling the movement substantially parallel to the pivot axis. The mechanism may further comprise a second spring configured to push the at least two parts telescopically outward from each other. The apparatus may further comprise locking elements configured to lock the first body part to the second body part in the second operating position. The locking elements may be configured to be releasable from each other in response to the movement of the first body part with respect to the second body part substantially parallel to the pivot axis. Furthermore, the mechanism may comprise a hinge. The first body part and the second body part may be configured to communicate with each other over a wireless connection.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
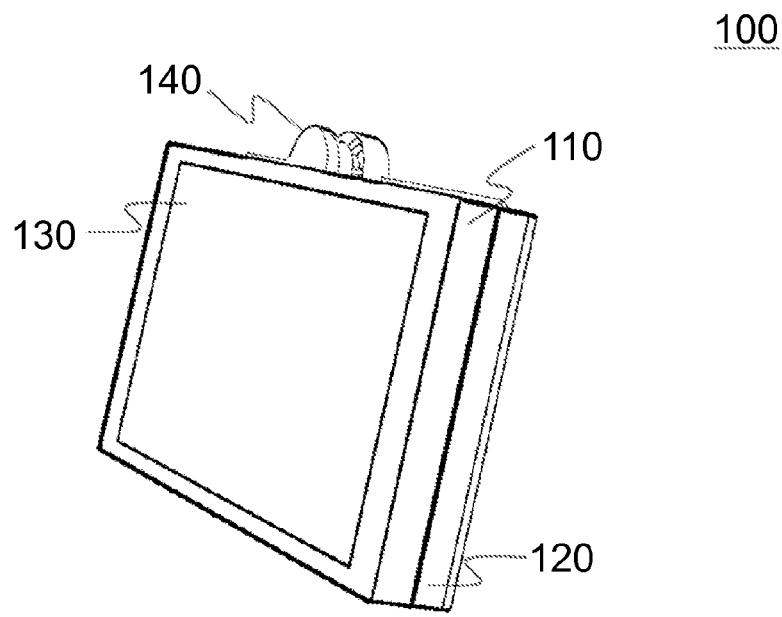
FIG. 1 shows a schematic picture of an apparatus in a first operating position according to an example embodiment of the invention.

FIG. 1 shows a schematic picture of an apparatus in a first operating position according to an example embodiment of the invention. In this example, the apparatus 100 is a mobile handheld electronic device. In FIG. 1 the apparatus 100 is shown in such a way that the front of the apparatus 100 is on the left. The apparatus 100 comprises at least a first body part 110 and a second body part 120. In an embodiment, the first body part 110 may comprise a first user interface 130. The first user interface 130 may comprise a display and an input element (not shown), such as a keyboard or a keypad. The display may be, for example, a touch display. The input element may be, for example, a full qwerty or ITU-T keyboard or a smaller keypad with limited keys. It may be a touch screen as well. In an embodiment, the second body part 120 may be located behind the first body part 110 in the first operating position. Such position allows a user to operate the apparatus 100 by using the first user interface 130 and still fits the need for a pocketable device.

In an example embodiment of the invention, the apparatus 100 may also comprise a mechanism 140 allowing the first body part 110 to move between the first operating position and a second operating position. The mechanism 140 may be configured to allow at least rotating of the body parts 110, 120 with respect to each other over a pivot axis, and move the body parts 110, 120 with respect to each other substantially parallel to the pivot axis. The body parts 110, 120 may form a bottom or front cover of the apparatus 100.

Figure 2A:
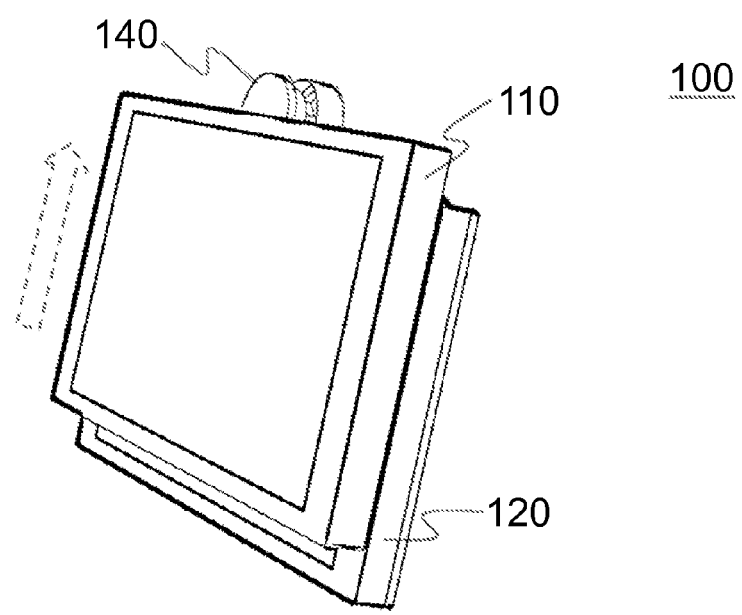
FIG. 2a shows a schematic picture of an apparatus in a first intermediate position according to an example embodiment of the invention.

FIG. 2a shows a schematic picture of an apparatus 100 in a first intermediate position according to an example embodiment of the invention. In such position, the first body part 110 is moved from the first operating position upwards, revealing underneath the second body part 120. The mechanism 140 allows the movement and may comprise at least one spring (not shown) for forcing the first body part 110 between the first operating position and the first intermediate position. In an embodiment, the apparatus 100 comprises a locking mechanism allowing the user to lock the first body part 110 to the second body part 120 in the first operating position. Such locking mechanism may comprise mechanical locking elements, such as a latch in the first body part 110 and a corresponding groove in the second body part 120, for example.

Figure 2B:
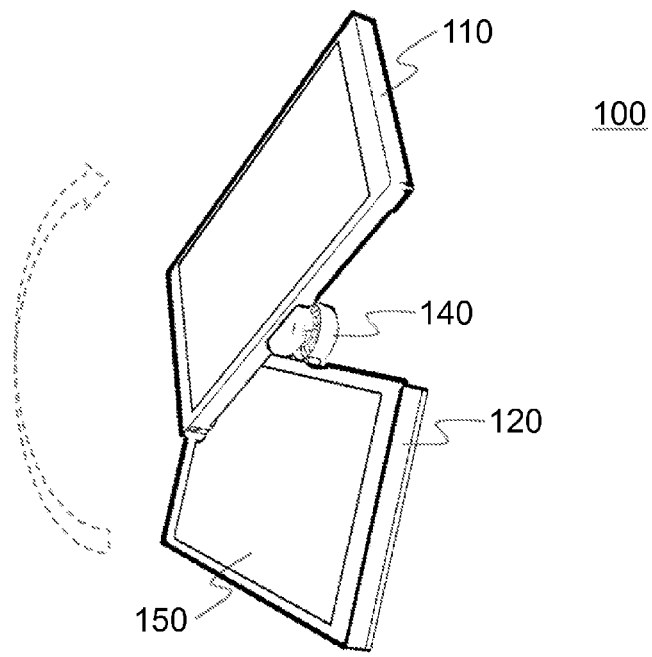
FIG. 2b shows a schematic picture of an apparatus in a position between the first and a second intermediate position according to an example embodiment of the invention.

FIG. 2b shows a schematic picture of an apparatus 100 in a position between the first and a second intermediate position according to an example embodiment of the invention. In such position the first body part 110 is being rotated with respect to the second body part 120 over a pivot axis from the first intermediate position to the second intermediate position, revealing underneath the second body part 120 with a second user interface 150. The second user interface 150 may comprise a display and an input element (not shown), such as a keyboard or a keypad. The display may be, for example, a touch display. The input element may be, for example, a full qwerty or ITU-T keyboard or a smaller keypad with limited keys. It may be a touch screen as well. The mechanism 140 allows the movement and may comprise at least one friction element (not shown) for smoothening the rotation and helping the user to sense the different positions of the first and the second intermediate positions.

Figure 2C:
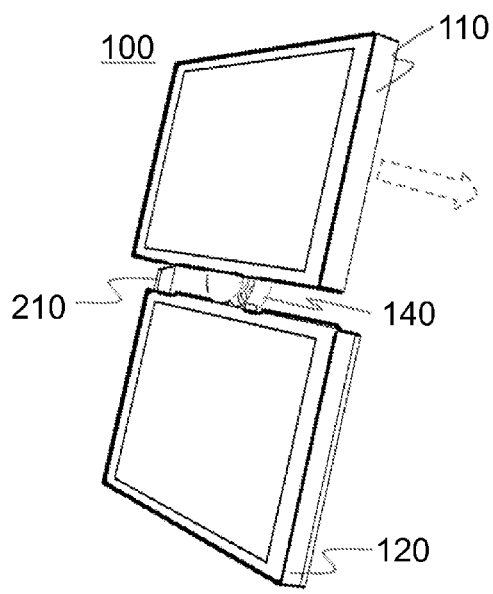
FIG. 2c shows a schematic picture of an apparatus in a second intermediate position according to an example embodiment of the invention.

FIG. 2c shows a schematic picture of an apparatus 100 in the second intermediate position according to an example embodiment of the invention. In such position the first body part 110 is fully rotated with respect to the second body part 120 over a pivot axis from the first intermediate position to the second intermediate position, fully revealing underneath the second body part 120 with a second user interface. The first body part 110 is slightly above the second body part 120, because the first body part 110 is being rotated from the top of the second body part 120. The mechanism 140 may comprise a positioning element (not shown) allowing the user to temporarily lock the mechanism 140 in the second intermediate position.

In an embodiment, the apparatus 100 comprises a locking mechanism 210 for a second operating position. Such locking mechanism may be hidden inside the first or the second body part 110, 120 until reaching the second intermediate position. Such locking mechanism 210 may allow the user to lock the first body part 110 to the second body part 120 in the second operating position. Such locking mechanism may comprise mechanical locking elements, such as a latch in the first body part 110 and a corresponding groove in the second body part 120, for example. Moving the first body part 110 with respect to the second body part 120 substantially parallel to the pivot axis, a third intermediate position may be reached. Such movement is illustrated by an arrow shown in FIG. 2c.

Figure 2D:
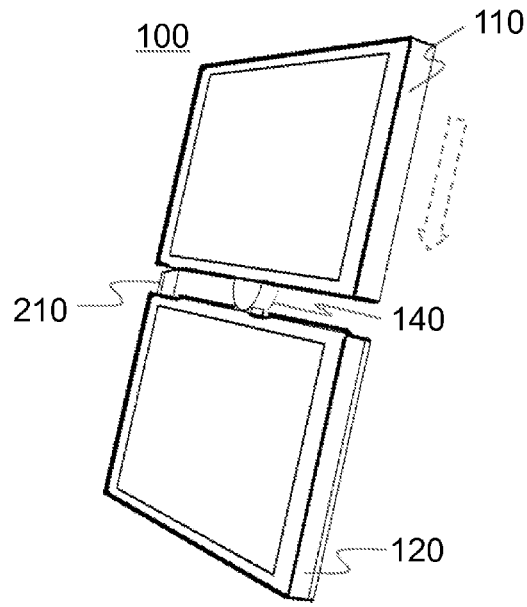
FIG. 2d shows a schematic picture of an apparatus in a third intermediate position according to an example embodiment of the invention.

FIG. 2d shows a schematic picture of an apparatus in the third intermediate position according to an example embodiment of the invention. In such position the first body part 110 is fully rotated with respect to the second body part 120 over a pivot axis, and the first body part 110 is further moved with respect to the second body part 120 substantially parallel to the pivot axis. Eventually, the first body part 110 and the second body part 120 are leveled, side by side. The locking mechanism 210 for a second operating position is ready to be activated. Moving the first body part 110 with respect to the second body part 120 substantially perpendicular to the pivot axis from the third intermediate position, the second operating position may be reached. Such movement is illustrated by an arrow shown in FIG. 2d. In an embodiment, the mechanism 140 may slide inside the second body part 120 when moving from the third intermediate position of FIG. 2d to the second operating position.

Figure 3:
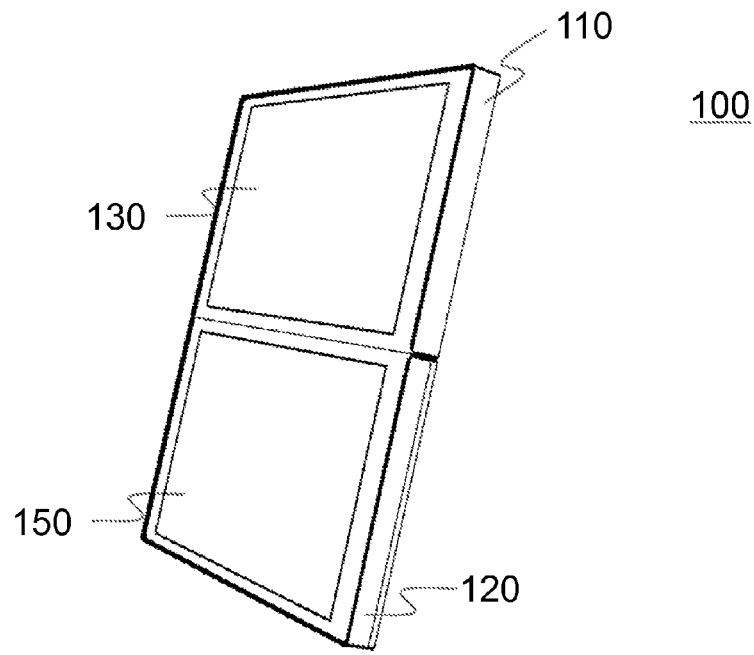
FIG. 3 shows a schematic picture of an apparatus in a second operating position according to an example embodiment of the invention.

FIG. 3 shows a schematic picture of an apparatus 100 in the second operating position according to an example embodiment of the invention. In such position the first body part 110 is moved alongside the second body part 120. Both the first user interface 130 and the second user interface 150 are operable by the user. The mechanism 140 of earlier figures may be hidden inside the second body part 150, providing an edge-to-edge dual screen like an internet tablet.

According to an example embodiment of the invention, a transition from the second operating position of FIG. 3 to the first operating position of FIG. 1 may be carried out similarly as described above, but in reverse order.

Figure 4:
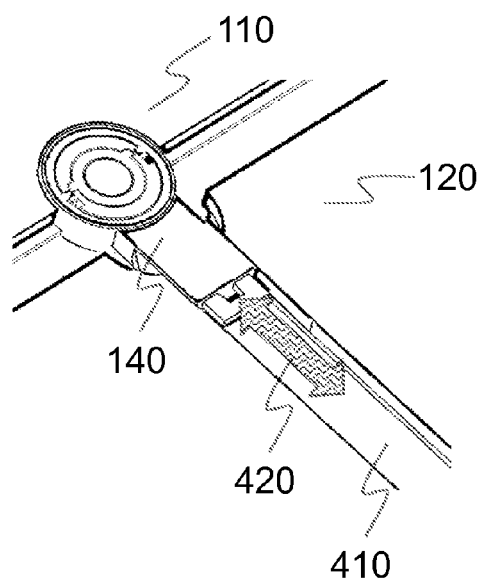
FIG. 4 presents a schematic picture of a mechanism configured to move and rotate body parts of an apparatus according to an example embodiment of the invention.

FIG. 4 presents a schematic picture of a mechanism 140 configured to move and rotate body parts 110, 120 of an apparatus according to an example embodiment of the invention. In this example the first body part 110 and the second body part 120 are shown in the third intermediate position and the first body part 110 is about to move alongside the second body part 120 for the second operating position. The second body part 120 may comprise a recess 410 for the mechanism 140. At least part of the mechanism 140 may slide in to the recess 410 in different positions allowing the movements of the first body part 110 with respect to the second body part 120 substantially perpendicular to the pivot axis. Furthermore, the round shaped grooves in the first body part 110 and the second body part 120 allow the round part of the mechanism 140 to smoothly fit partially inside the body parts 110, 120. Such fitting enable the placing of the body parts 110, 120 alongside each other with reduced visibility of the mechanism 140. In an embodiment, the mechanism 140 may comprise a spring 420 forcing the mechanism 140 inward to the recess 410 of the second body part. Such spring 420 may help the mechanism 140 to guide the movements to the first or the second operating positions.

Figure 5:
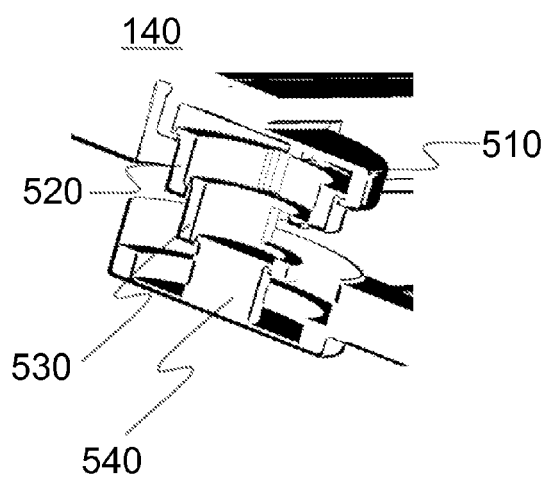
FIG. 5 presents a schematic picture of a mechanism configured to move and rotate body parts of the apparatus according to an example embodiment of the invention.

FIG. 5 presents a schematic picture of a mechanism 140 configured to move and rotate the first body part and the second body part of the apparatus according to an example embodiment of the invention. The mechanism 140 may comprise at least two parts configured to be telescopically movable with respect to each other enabling the movement substantially parallel to the pivot axis. In this example, the mechanism 140 comprises a first telescopic part 510 attached to the first body part, a second telescopic part 520, a third telescopic part 530 and a fourth telescopic part 540. The telescopic parts 510-540 may be configured to be telescopically movable with respect to each other. Typically at least two telescopic parts 510-540 could be used to provide the mechanism 140. In an embodiment, the mechanism 140 may comprise a second spring (not shown) forcing the telescopic parts 510-540 of the mechanism 140 to extend outward. Such spring may help the mechanism 140 to guide the movements to the first or the third intermediate positions.

Figure 6:
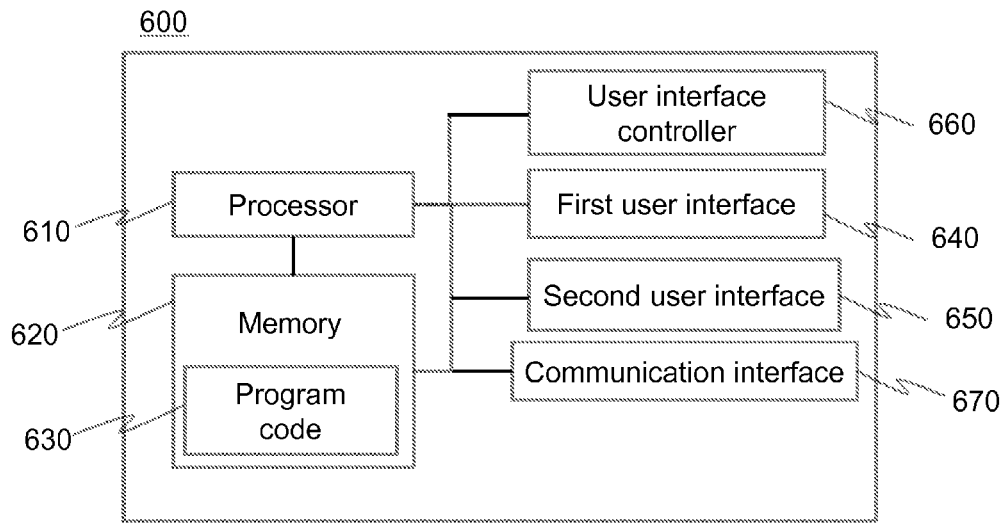
FIG. 6 presents an example block diagram of an apparatus in which various embodiments of the invention may be applied.

FIG. 6 presents an example block diagram of an apparatus 600 in which various embodiments of the invention may be applied. This may be a user equipment (UE), user device or apparatus, such as a mobile terminal or other communication device.

The general structure of the apparatus 600 comprises a first user interface 640, a second user interface 650, a communication interface 670, a processor 610, and a memory 620 coupled to the processor 610. The apparatus 600 further comprises software 630 stored in the memory 620 and operable to be loaded into and executed in the processor 610. The software 630 may comprise one or more software modules and can be in the form of a computer program product. The apparatus 600 may further comprise a user interface controller 660.

The processor 610 may be, e.g., a central processing unit (CPU), a microprocessor, a digital signal processor (DSP), a graphics processing unit, or the like. FIG. 6 shows one processor 610, but the apparatus 600 may comprise a plurality of processors.

The memory 620 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 600 may comprise a plurality of memories. The memory 620 may be constructed as a part of the apparatus 600 or it may be inserted into a slot, port, or the like of the apparatus 600 by a user. The memory 620 may serve the sole purpose of storing data, or it may be constructed as a part of an apparatus serving other purposes, such as processing data.

The first user interface 640 may comprise for example a liquid crystal display (LCD), a light-emitting diode (LED) based display or a touch-sensitive surface. The touch sensitive surface may be integrated to the display as a touch display or a touch screen. The touch-sensitive surface may also be included as a separate element, for example as a touchpad.

The user interface controller 660 may comprise circuitry for receiving input from a user of the apparatus 600, e.g., via a keyboard, graphical user interface shown on the display of the user interfaces 640, 650 of the apparatus 600, speech recognition circuitry, or an accessory device, such as a headset, and for providing output to the user via, e.g., a graphical user interface or a loudspeaker.

The communication interface module 670 implements at least part of radio transmission. The communication interface module 670 may be, e.g., a radio interface module, such as a WLAN, Bluetooth, GSM/GPRS, CDMA, WCDMA, or LTE (Long Term Evolution) radio module. The communication interface module 670 may be integrated into the apparatus 600 or into an adapter, card or the like that may be inserted into a suitable slot or port of the apparatus 600. The communication interface module 670 may support one radio interface technology or a plurality of technologies. FIG. 6 shows one communication interface module 670, but the apparatus 600 may comprise a plurality of communication interface modules 670.

In an example embodiment of the invention, the communication interface module 670 comprises at least a first communication interface module and a second communication interface module. The first communication interface module may be located in the first body part and the second communication interface module may be located in the second body part. The first communication interface module and the second communication interface module may be configured to provide communications between the first body part and the second body part. The communications may be wired or wireless, using the above described radio modules, for example.

A skilled person appreciates that in addition to the elements shown in FIG. 6, the apparatus 600 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 600 may comprise a disposable or rechargeable battery (not shown) for powering the apparatus 600 when external power if external power supply is not available.

Figure 7:
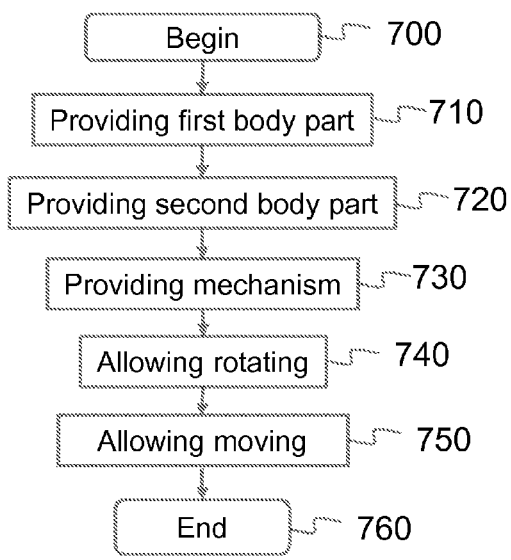
FIG. 7 shows a flow diagram showing rotating and moving operations in an apparatus in accordance with an example embodiment of the invention.

FIG. 7 shows a flow diagram showing rotating and moving operations in an apparatus in accordance with an example embodiment of the invention. In step 700, the method is started. In step 710, a first body part comprising a first user interface is provided. In step 720, a second body part comprising a second user interface is provided. A mechanism is provided in step 730. In step 740, rotating the first body part with respect to the second body part over a pivot axis is allowed by the mechanism. In step 750, moving the first body part with respect to the second body part substantially parallel to the pivot axis is allowed by the mechanism. The method ends in step 760.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof Hence, the scope of the invention is only restricted by the appended patent claims.

The invention claimed is:

1. An apparatus comprising:
   a first body part comprising a first user interface;
   a second body part comprising a second user interface;
   a mechanism configured to:
      rotate the first body part with respect to the second body part over a pivot axis; and
      move the first body part with respect to the second body part substantially parallel to the pivot axis.

2. The apparatus of claim 1, wherein the first user interface comprises a first display and the second user interface comprises a second display.

3. The apparatus of claim 1, wherein in a first operating position only the first user interface is operable by a user.

4. The apparatus of claim 3, wherein in the first operating position the first body part is configured to be placed on top of the second body part.

5. The apparatus of claim 1, wherein in a second operating position the first user interface and the second user interface are operable by the user.

6. The apparatus of claim 5, wherein in the second operating position the second body part is configured to be alongside of the first body part.

7. The apparatus of claim 1, wherein the mechanism is further configured to:
   move the first body part with respect to the second body part substantially perpendicular to the pivot axis from a first operating position to a first intermediate position;
   rotate the first body part with respect to the second body part over a pivot axis from the first intermediate position to a second intermediate position;
   move the first body part with respect to the second body part substantially parallel to the pivot axis from the second intermediate position to a third intermediate position; and
   move the first body part with respect to the second body part substantially perpendicular to the pivot axis from the third intermediate position to a second operating position.

8. The apparatus of claim 7, wherein the mechanism is configured to be at least partially located in a recess of the second body part when the apparatus is in the first operating position or in the second operating position.

9. The apparatus of claim 8, wherein the mechanism is configured to be moved outward from the recess of the second body part when the first body part is moved from the first operating position to the first intermediate position.

10. The apparatus of claim 8, further comprising a first spring configured to force the mechanism inward to the recess of the second body part when the first body part is in the first intermediate position or in the third intermediate position.

11. The apparatus of claim 1, wherein the mechanism comprises at least two parts configured to be telescopically movable with respect to each other enabling the movement substantially parallel to the pivot axis.

12. The apparatus of claim 11, wherein the mechanism further comprises a second spring configured to push the at least two parts telescopically outward from each other.

13. The apparatus of claim 1, further comprising locking elements configured to lock the first body part to the second body part in a second operating position.

14. The apparatus of claim 13, wherein the locking elements are configured to be releasable from each other in response to the movement of the first body part with respect to the second body part substantially parallel to the pivot axis.

15. The apparatus of claim 1, wherein the mechanism comprises a hinge.

16. The apparatus of claim 1, wherein the first body part and the second body part are configured to communicate with each other over a wireless connection.

17. The apparatus of claim 1, wherein the first user interface comprises a first touch screen, wherein the second user interface comprises a second touch screen, and wherein the mechanism is configured to provide the first body part alongside the second body part such that an edge-to-edge dual screen operating position is provided.

18. An apparatus comprising:
   a first body part comprising a first user interface;
   a second body part comprising a second user interface; and
   a mechanism between the first body part and the second body part, wherein the mechanism is configured to rotate the first body part with respect to the second body part over a pivot axis, and wherein the mechanism is configured to move the first body part with respect to the second body part substantially parallel to the pivot axis;
   wherein the apparatus is configured to lock the first body part to the second body part in a first or second operating position.

* * * * *